US012640915B2

(12) United States Patent
Alia et al.

(10) Patent No.: US 12,640,915 B2
(45) Date of Patent: May 26, 2026

(54) SYSTEMS AND METHODS FOR QUANTUM-SAFE KEY INFRASTRUCTURES

(71) Applicant: JPMORGAN CHASE BANK, N.A., New York, NY (US)

(72) Inventors: Obada Alia, Bristol (GB); Albert Huang, Singapore (SG); Charles Lim, Singapore (SG); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 88 days.

(21) Appl. No.: 18/587,188

(22) Filed: Feb. 26, 2024

(65) Prior Publication Data

US 2025/0274271 A1 Aug. 28, 2025

(51) Int. Cl.
*H04L 9/08* (2006.01)

(52) U.S. Cl.
CPC .................................. *H04L 9/0852* (2013.01)

(58) Field of Classification Search
CPC ....... H04L 9/0852; H04L 9/0819; H04L 9/14; H04L 9/0891; H04L 9/0869; G06F 21/72
See application file for complete search history.

(56) References Cited

U.S. PATENT DOCUMENTS

| | | | | |
|---|---|---|---|---|
| 8,929,554 B2 * | 1/2015 | Hughes | ................. | H04L 9/0852 |
| | | | | 380/263 |
| 9,509,506 B2 * | 11/2016 | Hughes | ................. | H04L 9/3247 |
| 9,680,640 B2 * | 6/2017 | Hughes | ................. | H04L 9/3226 |
| 9,887,976 B2 * | 2/2018 | Hughes | ................. | H04L 9/3226 |
| 11,973,861 B2 * | 4/2024 | Burnett | ................. | H04L 9/0858 |
| 12,052,350 B2 * | 7/2024 | M M | ..................... | H04W 36/10 |
| 12,225,110 B2 * | 2/2025 | Gao | ..................... | H04L 9/0855 |
| 12,301,702 B2 * | 5/2025 | Von Willich | .......... | H04L 9/0869 |
| 12,323,512 B1 * | 6/2025 | Huberman | ............ | H04L 9/0852 |
| 12,335,378 B2 * | 6/2025 | Menchetti | ............ | H04L 9/0858 |
| 12,341,879 B2 * | 6/2025 | Takahashi | ............. | H04L 9/0855 |
| 2013/0272524 A1 * | 10/2013 | Hughes | ............. | H04W 12/0433 |
| | | | | 380/279 |

* cited by examiner

*Primary Examiner* — Hosuk Song
(74) *Attorney, Agent, or Firm* — GREENBERG TRAURIG LLP

(57) ABSTRACT
Systems and methods for quantum-safe key infrastructures are disclosed. A method may include: (1) generating, by a first symmetric key device at a first location with a second symmetric key device at a second location, and over a symmetric key distribution channel, a symmetric key; (2) receiving, by a first encryptor at the first location, data from a first server or application; (3) encrypting, by the first encryptor, the data using the symmetric key; (4) communicating, by the first encryptor, the encrypted data to a second encryptor at the second location over a quantum-safe communication channel; (5) receiving, by the second encryptor, the symmetric key from the second symmetric key device; (6) decrypting, by the second encryptor, the encrypted data with the symmetric key; and (7) providing, by the second encryptor, the data to a second server or application.

17 Claims, 5 Drawing Sheets

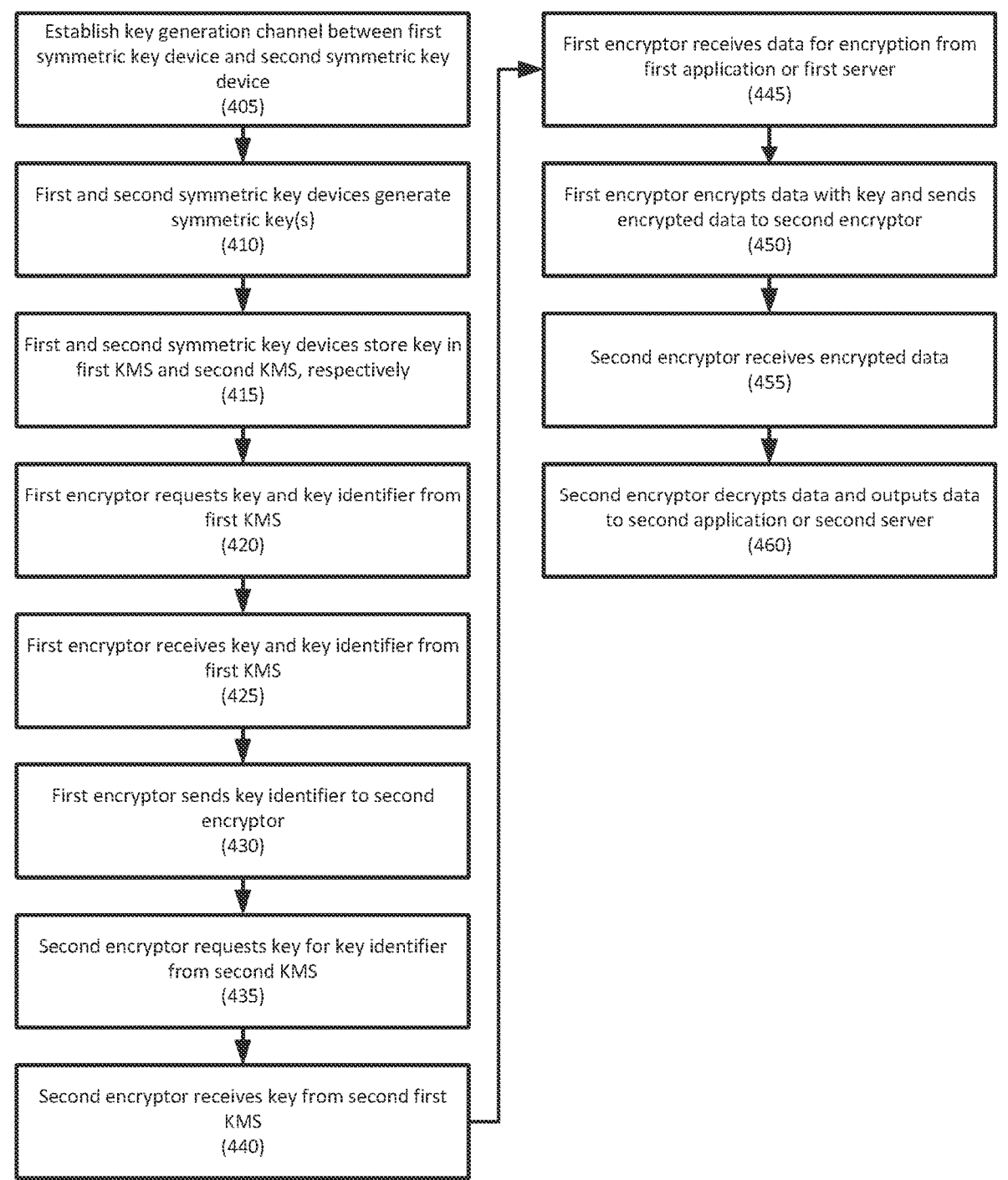

Establish key generation channel between first symmetric key device and second symmetric key device
(405)

First and second symmetric key devices generate symmetric key(s)
(410)

First and second symmetric key devices store key in first KMS and second KMS, respectively
(415)

First encryptor requests key and key identifier from first KMS
(420)

First encryptor receives key and key identifier from first KMS
(425)

First encryptor sends key identifier to second encryptor
(430)

Second encryptor requests key for key identifier from second KMS
(435)

Second encryptor receives key from second first KMS
(440)

First encryptor receives data for encryption from first application or first server
(445)

First encryptor encrypts data with key and sends encrypted data to second encryptor
(450)

Second encryptor receives encrypted data
(455)

Second encryptor decrypts data and outputs data to second application or second server
(460)

FIGURE 4

SYSTEMS AND METHODS FOR QUANTUM-SAFE KEY INFRASTRUCTURES

BACKGROUND OF THE INVENTION

1. Field of the Invention

Embodiments relate to systems and methods for quantum-safe key infrastructures.

2. Description of the Related Art

Quantum-safe technologies are required to mitigate the security risks posed by future quantum computers. A promising solution is to deploy Quantum Key Distribution (QKD), which exploits the laws of quantum mechanics to securely distribute secret truly random keys between authenticated users embedded in an untrusted optical network without the need for computational assumptions.

Most of the current encryption solutions are software based and they do not provide the infrastructure for quantum-safe encryption keys. Therefore, the security is based on post quantum cryptography (PQC) which has not yet been proven to be secure against quantum computers. Finally, the security of such solution is based on an initial seed and therefore has limited entropy.

SUMMARY OF THE INVENTION

Systems and methods for quantum-safe key infrastructures are disclosed. In one embodiment, a system may include: a first location comprising a first symmetric key device and a first encryptor; a second location comprising a second symmetric key device and a second encryptor; a symmetric key distribution channel between the first symmetric key device and the second symmetric key device, wherein the first symmetric key device and the second symmetric key device communicate over the symmetric key distribution channel; and a quantum-safe communication channel between the first encryptor and the second encryptor, wherein the first encryptor and the second encryptor communicate over the quantum-safe communication channel; wherein the first symmetric key device and the second symmetric key device are configured to generate a symmetric key; the first encryptor may be configured to receive data from a first server or application, to encrypt the data using the symmetric key from the first symmetric key device, and to communicate the encrypted data to the second encryptor over the quantum-safe communication channel; and the second encryptor may be configured to receive the symmetric key from the second symmetric key device, to decrypt the encrypted data using the symmetric key, and to provide the data to a second server or application.

In one embodiment, the system may also include a first key management system that may be configured to store the symmetric key and a second key management system that may be configured to store the symmetric key, wherein the first encryptor may be configured to receive the symmetric key from the first key management system, and the second encryptor may be configured to receive the symmetric key from the second key management system.

In one embodiment, the first symmetric key device and the second symmetric key device are further configured to generate a plurality of symmetric keys, the first encryptor may be further configured to request a symmetric key identifier and one of the plurality of symmetric keys from the first key management system and to send the symmetric key identifier with the encrypted data to the second encryptor, and the second encryptor may be further configured to request the symmetric key from the second key management system using the symmetric key identifier.

In one embodiment, the first symmetric key device and the second symmetric key device generate the symmetric key using a pre-shared key.

In one embodiment, the first symmetric key device and the second symmetric key device generate the symmetric key using quantum key distribution.

In one embodiment, the quantum-safe communication channel comprises a direct optical fiber connection.

In one embodiment, the first location may include the first server or application, and the second location may include the second server or application.

In one embodiment, the first location or the second location may include a data center.

In one embodiment, the first encryptor may include a plurality of first encryptors, and the first server or application may include a plurality of first data servers, and each of the plurality of first encryptors may be associated with one of the plurality of first data servers.

In one embodiment, the second encryptor may include a plurality of second encryptors, and the second server or application may include a plurality of second data servers, and each of the plurality of second encryptors may be associated with one of the plurality of second data servers.

According to another embodiment, a method may include: (1) generating, by a first symmetric key device at a first location with a second symmetric key device at a second location, and over a symmetric key distribution channel, a symmetric key; (2) receiving, by a first encryptor at the first location, data from a first server or application; (3) encrypting, by the first encryptor, the data using the symmetric key; (4) communicating, by the first encryptor, the encrypted data to a second encryptor at the second location over a quantum-safe communication channel; (5) receiving, by the second encryptor, the symmetric key from the second symmetric key device; (6) decrypting, by the second encryptor, the encrypted data with the symmetric key; and (7) providing, by the second encryptor, the data to a second server or application.

In one embodiment, the method may also include: storing, by the first symmetric key device, the symmetric key in a first key management system at the first location; and storing, by the second symmetric key device the symmetric key in a second key management system at the second location; wherein the first encryptor receives the symmetric key from the first key management system, and the second encryptor receives the symmetric key from the second key management system.

In one embodiment, the first symmetric key device and the second symmetric key device generate a plurality of symmetric keys, and the method may also include: requesting, by the first encryptor a symmetric key identifier and one of the plurality of symmetric keys from the first key management system; sending, by the first encryptor, the symmetric key identifier with the encrypted data to the second encryptor; and requesting by the second encryptor, the symmetric key from the second key management system using the symmetric key identifier.

In one embodiment, the first symmetric key device and the second symmetric key device generate the symmetric key using a pre-shared key.

In one embodiment, the first symmetric key device and the second symmetric key device generate the symmetric key using quantum key distribution.

In one embodiment, the quantum-safe communication channel may include a direct optical fiber connection.

In one embodiment, the first location may include the first server or application, and the second location may include the second server or application.

In one embodiment, the first location or the second location may include a data center.

In one embodiment, the first encryptor may include a plurality of first encryptors, and the first server or application may include a plurality of first data servers, and each of the plurality of first encryptors may be associated with one of the plurality of first data servers.

In one embodiment, the second encryptor may include a plurality of second encryptors, and the second server or application may include a plurality of second data servers, and each of the plurality of second encryptors may be associated with one of the plurality of second data servers.

BRIEF DESCRIPTION OF THE DRAWINGS

For a more complete understanding of the present invention, the objects and advantages thereof, reference is now made to the following descriptions taken in connection with the accompanying drawings in which:

FIG. 4 illustrates a method for using a quantum-safe key infrastructure according to another embodiment;

DETAILED DESCRIPTION OF PREFERRED EMBODIMENTS

Embodiments relate to systems and methods for quantum-safe key infrastructures.

Embodiments may provide a quantum-safe symmetric key infrastructure that may provide encryption keys to customers. The encryption keys may be used to secure a connection between two end points in a point-to-point configuration, or a point-to-multi-point configuration. The symmetric keys may be generated using Quantum Key Distribution (QKD) or any other suitable methods, classical or quantum. The symmetric keys may then be used across a variety of different encryption protocols.

In one embodiment, one encryptor may be provided per customer at a location. The infrastructure provides an interface that feeds quantum-safe symmetric keys into customer's encryptor. The symmetric keys may be generated using QKD or any other suitable methods (e.g., pre-shared key). The symmetric keys may be used with multiple encryptors and in different communication layers and encryption schemes, such as OTNsec (layer1), MACsec (layer2), IPsec (layer3), etc. Using a key interface, a customer may receive a symmetric key from a symmetric key generation device and provide the symmetric key to an encryptor. The customer key interface may be any suitable protocol (e.g., REST API) running on software or hardware-based devices both wired and wireless.

In another embodiment, multiple encryptors may be provided for one customer. Embodiments may provide a key interface into a customer's key management system (KMS) switch where the keys are stored. The KMS switch may be a hardware security module, a layer 2 switch, a computer server, a software-based solution, etc. The KMS switch may provide quantum-safe keys into multiple encryptors simultaneously. Each encryptor may run at different layers with different encryption schemes.

In another embodiment, multiple encryptors may be provided for multiple customers. For example, multiple customers may be located in a single data center (e.g., in a Main Distribution Frame room) or otherwise co-located. Each customer may be provided with a key interface into its rack/cage and the key interface connect directly to the encryptors or to another KMS switch.

In still another embodiment, encryptors may be provided as part of an infrastructure. One or multiple encryptors may be used, and each customer may be provided with a data link to one of the encryptors. The customer may encrypt its data using a pre-shared key or post-quantum cryptography before sending it to the encryptor.

Figure 1:
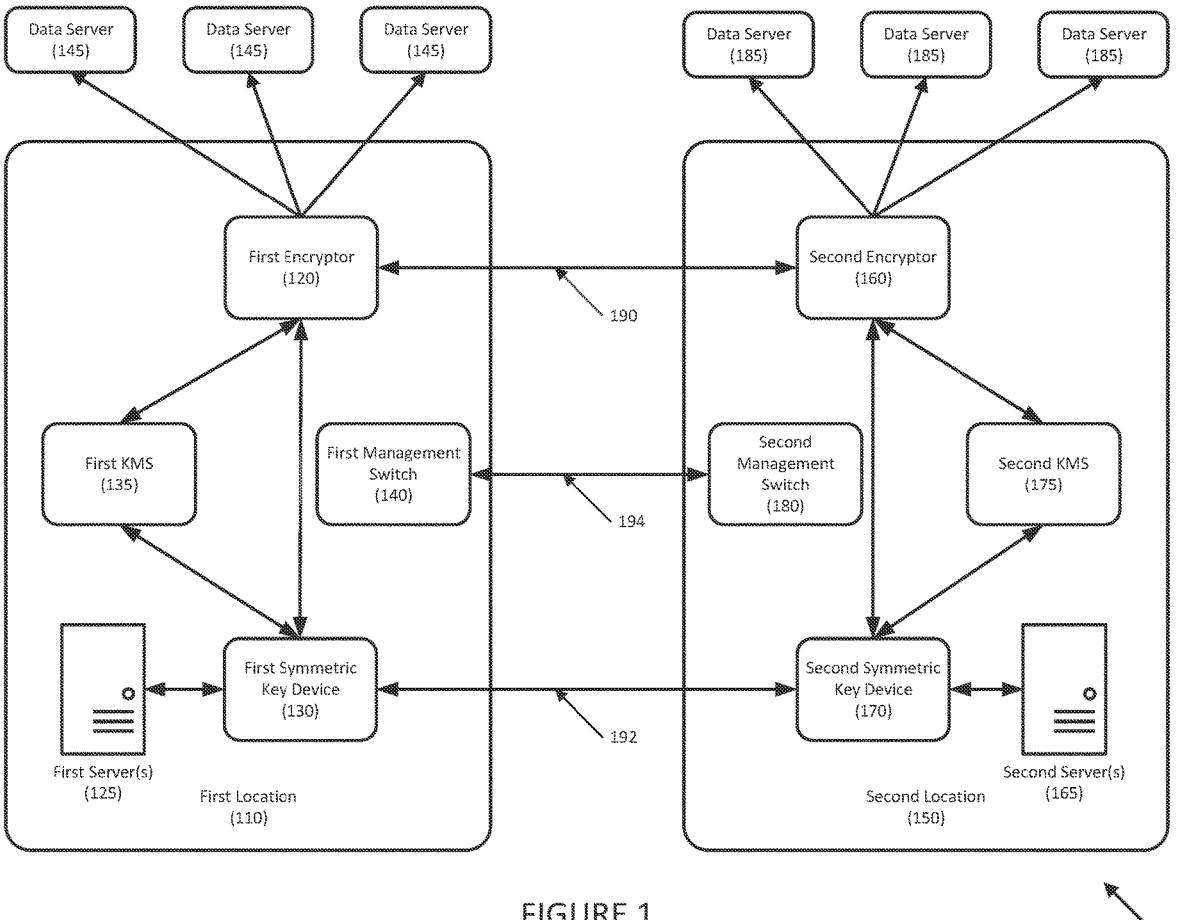
FIG. 1 illustrates a quantum-safe key infrastructure according to an embodiment.

Referring to FIG. 1, a quantum-safe key infrastructure is disclosed according to an embodiment. System 100 may include first location 110 and second location 150. First location 110 may include first encryptor 120, one or more first servers 125, first symmetric key device 130, and first key management service (KMS) 135. Second location 150 may include second encryptor 160, one or more second servers 165, second symmetric key device 170, and second KMS 175.

First location 110 and second location 150 may be data centers, offices, physical spaces, etc. In embodiments, first location and second location 150 may include a single customer, multiple customers, etc.

In embodiments, first KMS 135 and second KMS 175 may be optional. First KMS 135 and second KMS 175 may be, for example, hardware security modules, layer 2 switches, computer servers, software-based solutions, etc.

First encryptor 120 and second encryptor 160 may communicate over quantum-safe communication channel 190, such as a direct optical fiber link, a free-space link (e.g., a satellite link), etc. The quantum data may be communicated as photons or electromagnetic energy.

First encryptor 120 and second encryptor 160 may receive data from first server(s) 125 or second server(s) 165, and may encrypt or decrypt the data using symmetric keys from first symmetric key device 130 or second symmetric key device 170. The encrypted data may be communicated between first encryptor 120 and second encryptor 160.

Alternatively, first encryptor 120 and second encryptor 160 may receive symmetric keys from first KMS 135 or second KMS 175, respectively.

First encryptor 120 and second encryptor 160 may be located on-premises (e.g., at first location 110 or second location 150, respectively), in individual offices at locations 110 or 150, may be located in a cloud, etc.

First symmetric key device 130 and second symmetric key device 170 may be quantum key devices, key expansion devices (e.g., MACsec switches), etc. and may communicate using symmetric key distribution channel 192 (e.g., an optical fiber or free-space channel). First symmetric key device 130 and second symmetric key device 170 may perform key expansion. For example, first symmetric key device 130 and second symmetric key device 170 may start with a pre-shared key (PSK) and then, using classical or quantum protocols, may expand the key to many symmetrical keys. Examples of protocols include QKD, MACsec, etc. The PSK may be shared manually, or via asymmetric cryptography protocols, such as public key encryption including PQC, Diffie-Hellman exchange, Rivest-Shamir-Adleman (RSA) encryption, etc.

First symmetric key device 130 and second symmetric key device 170 may provide symmetric keys to first KMS 135 and second KMS 175, respectively.

In one embodiment, symmetric key distribution channel 192 may include one or more links. For example, for quantum key distribution, a first link may be provided for a quantum channel to transmit the encoded photons, a second link may be provided to synchronize the post processing algorithm, and a third link may be provided to synchronize the first KMS 135 and the second KMS 175.

First location 110 and second location 150 may further include first management switch 140 and second management switch 180, respectively. First management switch 140 and second management switch 180 may communicate over management communication link 194. First management switch 140 and second management switch 180 may provide management, control, key synchronization, etc. First management switch 140 may interface with first encryptor 120, first server(s) 125, first symmetric key device 130, and first KMS 135, and second management switch 180 may interface with second encryptor 160, second server(s) 165, second symmetric key device 170, and second KMS 175.

Servers 125 and 165 may be any suitable server, including physical and/or cloud-based server. Servers 125 and 165 may provide data to be securely communicated with another server at the same or a different location.

In one embodiment, system 100 may further include one or more data servers 145, 185. Customers may encrypt data from data servers 145, 185 before it is sent to first encryptor 120 or second encryptor 160 using, for example, a pre-shared key, or post-quantum cryptography before it is sent to first encryptor 120 or second encryptor 160. The data may then be further encrypted using a symmetric key and then communicated to the other location.

Figure 2:
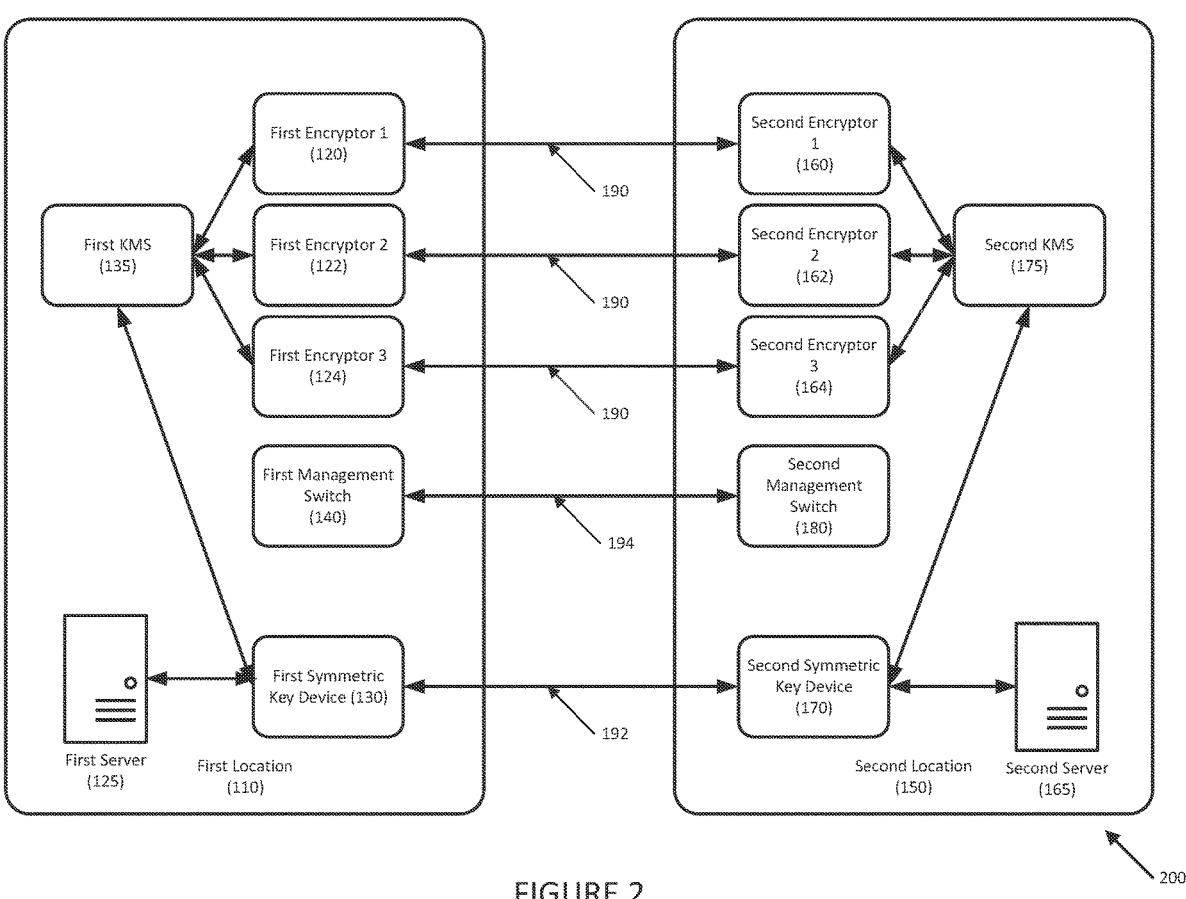
FIG. 2 illustrates a quantum-safe key infrastructure according to another embodiment.

FIG. 2 depicts a quantum-safe key infrastructure according to an embodiment. System 200 may include a plurality of first encryptors (e.g., first encryptor 1 120, first encryptor 2 122, first encryptor 3 124), and a plurality of second encryptors (e.g., second encryptor 1 160, second encryptor 2 162, second encryptor 3 164, etc.). First encryptors (e.g., first encryptor 1 120, first encryptor 2 122, first encryptor 3 124) may receive symmetric keys from first KMS 135, and second encryptors (e.g., second encryptor 1 160, second encryptor 2 162, second encryptor 3 164, etc.) may receive symmetric keys from second KMS 175.

First encryptors (e.g., first encryptor 1 120, first encryptor 2 122, first encryptor 3 124) and second encryptors (e.g., second encryptor 1 160, second encryptor 2 162, second encryptor 3 164, etc.) may interface with first symmetric key device 130 and second symmetric key device 170, respectively.

First KMS 135 and second KMS 175 may provide quantum-safe keys into multiple encryptors (e.g., first encryptor 1 120, first encryptor 2 122, first encryptor 3 124) and second encryptors (e.g., second encryptor 1 160, second encryptor 2 162, second encryptor 3 164, etc.), respectively, simultaneously.

First encryptors (e.g., first encryptor 1 120, first encryptor 2 122, first encryptor 3 124) and second encryptors (e.g., second encryptor 1 160, second encryptor 2 162, second encryptor 3 164, etc.) may be running at different layers and may implement different encryption schemes.

In one embodiment, each first encryptors (e.g., first encryptor 1 120, first encryptor 2 122, first encryptor 3 124) and each second encryptor (e.g., second encryptor 1 160, second encryptor 2 162, second encryptor 3 164, etc.) may include a plurality of encryptors. Each set of encryptors (e.g., first encryptor 1 120, first encryptor 2 122, first encryptor 3 124, second encryptor 1 160, second encryptor 2 162, second encryptor 3 164, etc.) may be associated with a customer. Each customer may be provided with a key interface to access the customer's server (e.g., first server 125, second server 165) as well as one or more of encryptors (e.g., first encryptor 1 120, first encryptor 2 122, first encryptor 3 124, second encryptor 1 160, second encryptor 2 162, second encryptor 3 164, etc.), first KMS 135 or second KMS 175, etc.

Figure 3:
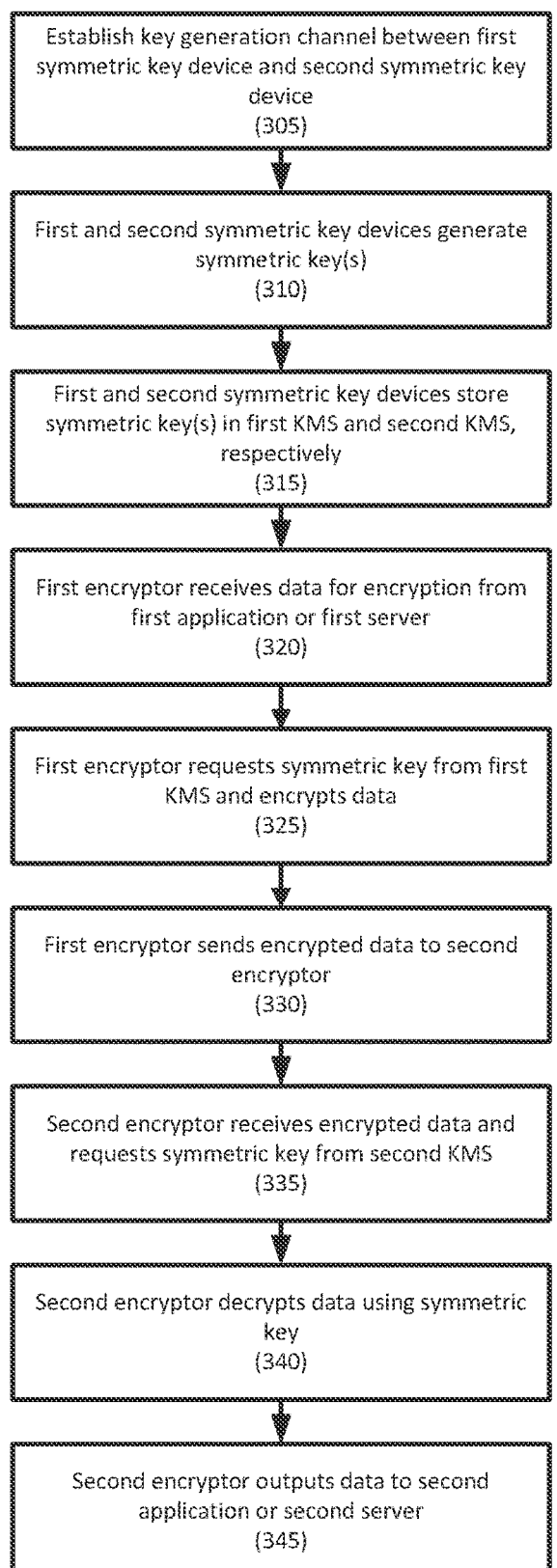
FIG. 3 illustrates a method for using a quantum-safe key infrastructure according to an embodiment.

Referring to FIG. 3, a method for using a quantum-safe key infrastructure according to an embodiment.

In step 305, a key generation channel between first symmetric key device and second symmetric key device may be established. For example, the first symmetric key device and the second symmetric key device may authenticate each other using a pre-shared key or certification.

In step 310, the first and second symmetric key devices generate symmetric key(s) using, for example, a pre-shared key. For example, with QKD, after one of the symmetric key devices sends single photons to the other, the receiving symmetric key device may perform post processing to get a symmetric key.

For classical key distribution, such as MACsec, after authorization, the first symmetric key device and the second symmetric key device may use algorithms, including key expansions, key deviation functions, and key wrap functions to share the same symmetric keys.

In one embodiment, the first and second symmetric key devices may generate a plurality of symmetric keys using a pre-shared key.

In step 315, the first and second symmetric key devices may optionally store the symmetric key(s) in a first KMS and a second KMS, respectively.

In step 320, a first encryptor at a first location may receive data for encryption from a first application or a first server. The first application or first server may be located on-premises, may be in the cloud, etc.

In step 325, the first encryptor may optionally request a symmetric key from the first KMS and then encrypt the data. For example, the first encryptor may request a symmetric key from the first KMS, and the first KMS may return a symmetric key and a symmetric key identifier to the first encryptor. The first KMS may select the next available symmetric key, or it may select the symmetric key from a pool of symmetric keys. If more than one encryptor is used at the first location, the first KMS may have a symmetric key for each encryptor, a pool of symmetric keys for each encryptor, etc.

If a KMS is not used, the first encryptor may receive the symmetric key from the first symmetric key device and may encrypt the data.

In step 330, the first encryptor may send the encrypted data to a second encryptor. In one embodiment, if multiple symmetric keys are available, the first encryptor may communicate an identity of the symmetric key to the second encryptor.

In step 335, the second encryptor may receive the encrypted data and may optionally request the symmetric key from the second KMS. In one embodiment, the second encryptor may provide the identifier for the symmetric key to the second KMS.

If a KMS is not used, the second encryptor may request the key from the second symmetric key device.

In step 340, the second encryptor may receive the symmetric key and may decrypt the data using the symmetric key.

In step 345, the second encryptor may output the data to a second application or a second server. The second application or the second server may be provided on-premises, in the cloud, etc.

Referring to FIG. 4, a method for using a quantum-safe key infrastructure according to another embodiment.

In step 405, a key generation channel between first symmetric key device and second symmetric key device may be established. This may be similar to step 305, above.

In step 410, the first and second symmetric key devices generate symmetric key(s) using, for example, a pre-shared key. In another embodiment, the first and second symmetric key devices may receive a secure key. This may be similar to step 315, above.

In one embodiment, the first and second symmetric key devices may generate a plurality of symmetric keys using a pre-shared key.

In step 415, the first and second symmetric key devices may optionally store the symmetric key(s) in a first KMS and a second KMS, respectively. This may be similar to step 315, above.

In step 420, a first encryptor at a first location may optionally request a symmetric key and an identifier from the first KMS to encrypt data.

In step 425, the first encryptor may receive the symmetric key and identifier from the first KMS. If a KMS is not used, the first encryptor may receive the symmetric key from the first symmetric key device and may encrypt the data.

In step 430, the first encryptor may send the symmetric key identifier to a second encryptor.

In step 435, the second encryptor at a first location may optionally request the symmetric key with the identifier from the first KMS.

In step 440, the second encryptor may receive the symmetric key from the second KMS.

In step 445, the first encryptor may receive data for encryption from a first application or a first server. The first application or first server may be located on-premises, may be in the cloud, etc.

In step 450, the first encryptor may encrypt the data with the symmetric key and may send the encrypted data to the second encryptor.

In step 455, the second encryptor may receive the encrypted data, and in step 460 may decrypt the data using the symmetric key that was retrieved from the KMS and may output the data to a second application or a second server. The second application or the second server may be provided on-premises, in the cloud, etc.

Figure 5:
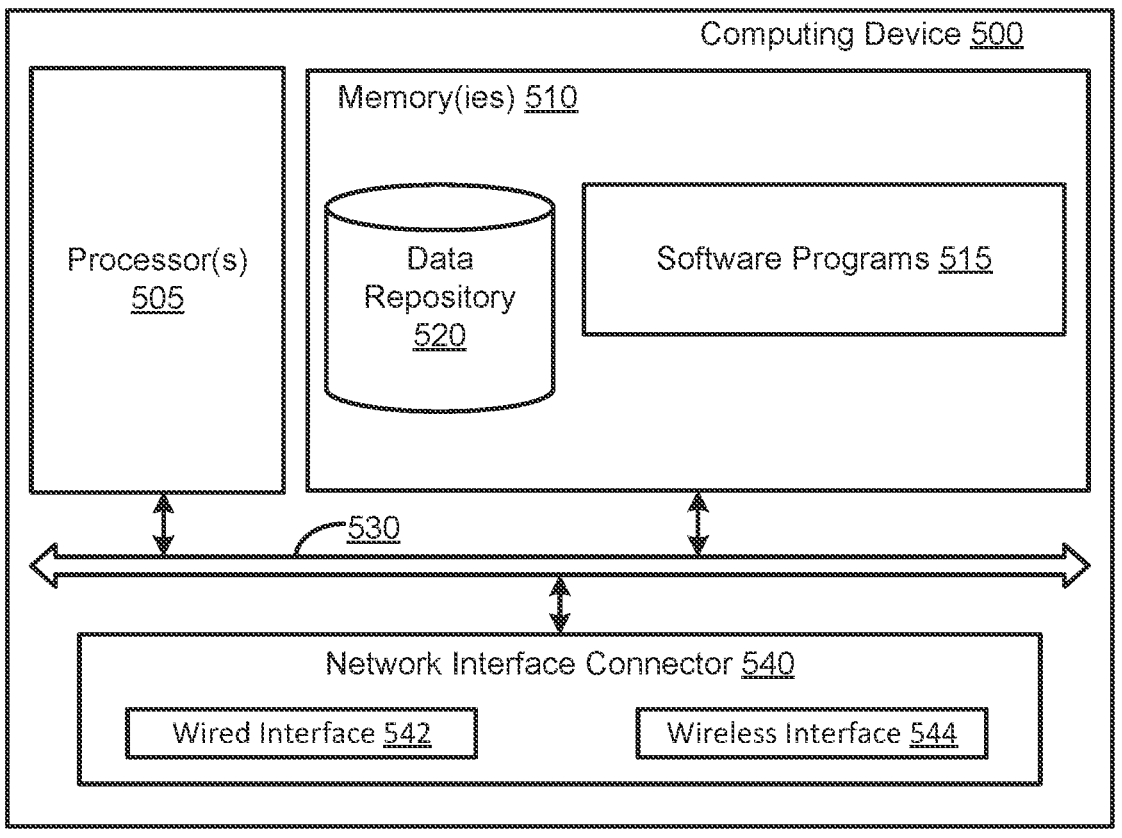
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface

542 or wireless network interface 544. Computing device 500 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system, comprising:
a first location comprising:
   a first symmetric key device; and
   a first encryptor;
a second location comprising:
   a second symmetric key device; and
   a second encryptor;
a symmetric key distribution channel between the first symmetric key device and the second symmetric key device, wherein the first symmetric key device and the second symmetric key device communicate over the symmetric key distribution channel; and
a quantum-safe communication channel between the first encryptor and the second encryptor, wherein the first encryptor and the second encryptor communicate over the quantum-safe communication channel;
wherein the first symmetric key device and the second symmetric key device are configured to generate a symmetric key using a pre-shared key and quantum key distribution;
the first encryptor is configured to receive data from a first server or application, to encrypt the data using the symmetric key from the first symmetric key device, and to communicate the encrypted data to the second encryptor over the quantum-safe communication channel; and
the second encryptor is configured to receive the symmetric key from the second symmetric key device, to decrypt the encrypted data using the symmetric key, and to provide the data to a second server or application.

2. The system of claim 1, further comprising a first key management system that is configured to store the symmetric key and a second key management system that is configured to store the symmetric key, wherein the first encryptor is configured to receive the symmetric key from the first key management system, and the second encryptor is configured to receive the symmetric key from the second key management system.

3. The system of claim 2, wherein the first symmetric key device and the second symmetric key device are further configured to generate a plurality of symmetric keys, the first encryptor is further configured to request a symmetric key identifier and one of the plurality of symmetric keys from the first key management system and to send the symmetric key identifier with the encrypted data to the second encryptor, and the second encryptor is further configured to request the symmetric key from the second key management system using the symmetric key identifier.

4. The system of claim 1, wherein the quantum-safe communication channel comprises a direct optical fiber connection.

5. The system of claim 1, wherein the first location comprises the first server or application, and the second location comprises the second server or application.

6. The system of claim 1, wherein the first location or the second location comprises a data center.

7. The system of claim 1, wherein the first encryptor comprises a plurality of first encryptors, and the first server or application comprises a plurality of first data servers, and each of the plurality of first encryptors is associated with one of the plurality of first data servers.

8. The system of claim 1, wherein the second encryptor comprises a plurality of second encryptors, and the second server or application comprises a plurality of second data servers, and each of the plurality of second encryptors is associated with one of the plurality of second data servers.

9. A method, comprising:
generating, by a first symmetric key device at a first location with a second symmetric key device at a second location, and over a symmetric key distribution channel, a symmetric key using a pre-shared key;
receiving, by a first encryptor at the first location, data from a first server or application;
encrypting, by the first encryptor, the data using the symmetric key;
communicating, by the first encryptor, the encrypted data to a second encryptor at the second location over a quantum-safe communication channel;
receiving, by the second encryptor, the symmetric key from the second symmetric key device;
decrypting, by the second encryptor, the encrypted data with the symmetric key; and
providing, by the second encryptor, the data to a second server or application.

10. The method of claim 9, further comprising:
storing, by the first symmetric key device, the symmetric key in a first key management system at the first location; and
storing, by the second symmetric key device the symmetric key in a second key management system at the second location;
wherein the first encryptor receives the symmetric key from the first key management system, and the second encryptor receives the symmetric key from the second key management system.

11. The method of claim 10, wherein the first symmetric key device and the second symmetric key device generate a plurality of symmetric keys, and further comprising:
requesting, by the first encryptor a symmetric key identifier and one of the plurality of symmetric keys from the first key management system;
sending, by the first encryptor, the symmetric key identifier with the encrypted data to the second encryptor; and
requesting by the second encryptor, the symmetric key from the second key management system using the symmetric key identifier.

12. The method of claim 9, wherein the first symmetric key device and the second symmetric key device generate the symmetric key using quantum key distribution.

13. The method of claim 9, wherein the quantum-safe communication channel comprises a direct optical fiber connection.

14. The method of claim 9, wherein the first location comprises the first server or application, and the second location comprises the second server or application.

15. The method of claim 9, wherein the first location or the second location comprises a data center.

16. The method of claim 9, wherein the first encryptor comprises a plurality of first encryptors, and the first server or application comprises a plurality of first data servers, and each of the plurality of first encryptors is associated with one of the plurality of first data servers.

17. The method of claim 9, wherein the second encryptor comprises a plurality of second encryptors, and the second server or application comprises a plurality of second data servers, and each of the plurality of second encryptors is associated with one of the plurality of second data servers.

\* \* \* \* \*